US008906468B2

(12) United States Patent
Bowman et al.

(10) Patent No.: US 8,906,468 B2
(45) Date of Patent: Dec. 9, 2014

(54) LOW GLOSS UV-CURED COATINGS FOR AIRCRAFT

(75) Inventors: Mark Bowman, New Kensington, PA (US); Harry Muschar, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 338 days.

(21) Appl. No.: 13/282,640

(22) Filed: Oct. 27, 2011

(65) Prior Publication Data

US 2013/0108798 A1  May 2, 2013

(51) Int. Cl.
*B05D 3/06* (2006.01)
*C09D 4/00* (2006.01)
*C09D 7/00* (2006.01)

(52) U.S. Cl.
CPC . *C09D 4/00* (2013.01); *C09D 7/005* (2013.01)
USPC ........................................................ 427/514

(58) Field of Classification Search
USPC ........................................................ 427/514
See application file for complete search history.

(56) References Cited

U.S. PATENT DOCUMENTS

| | | | |
|---|---|---|---|
| 3,748,190 A | 7/1973 | Weber, III et al. | |
| 3,898,349 A | 8/1975 | Kehr et al. | |
| 3,908,039 A | 9/1975 | Guthrie et al. | |
| 4,229,274 A | 10/1980 | Carlblom | |
| 4,233,205 A | 11/1980 | O'Connor et al. | |
| 4,682,612 A | 7/1987 | Giuliano | |
| 5,043,373 A * | 8/1991 | Hegedus et al. | 524/204 |
| 5,585,415 A | 12/1996 | Gorzalski et al. | |
| 2009/0047442 A1 | 2/2009 | Bowman | |
| 2009/0047443 A1 | 2/2009 | Bowman et al. | |
| 2009/0047531 A1 | 2/2009 | Bartley et al. | |
| 2009/0047546 A1 | 2/2009 | Bowman et al. | |
| 2009/0286002 A1 | 11/2009 | Iezzi et al. | |
| 2010/0276059 A1 | 11/2010 | Tian et al. | |

OTHER PUBLICATIONS

Freid, James R., "Gloss-Reduction Mechanisms of Radiation Cure Coatings", Radiation Curing, Feb. 1982, pp. 19-25.

* cited by examiner

*Primary Examiner* — Elena T Lightfoot
(74) *Attorney, Agent, or Firm* — Diane R. Meyers

(57) ABSTRACT

A method of applying a low gloss coating to a substrate such as the exterior surface of an aircraft is disclosed. The coating composition comprising a polyene, a polythiol, a flatting agent and a coloring pigment is applied to the substrate and given a first dosage of UV radiation followed by a second dosage in which the second dosage is greater than the first resulting in an ultralow gloss coating.

20 Claims, No Drawings

LOW GLOSS UV-CURED COATINGS FOR AIRCRAFT

STATEMENT REGARDING FEDERALLY SPONSORED RESEARCH

This invention was made with Government support under Contract No. RES 000058 awarded by the United States Department of Energy. The United States Government may have certain rights in this invention.

FIELD OF THE INVENTION

The present invention relates to a method of forming an ultraviolet (UV) light cured coating of low gloss particularly suited for military aircraft.

BACKGROUND OF THE INVENTION

Military aircraft are typically coated with a low gloss coating. The coating is usually spray applied and then cured. Curing can be by heating, which is a disadvantage because of the need for an oven big enough to contain the aircraft. The coating composition can be formulated such that the coating cures at ambient temperature; however, curing at ambient temperature is time consuming and can take from 8 to 24 hours. Curing by exposure to UV or actinic radiation is possible; however, the aircraft's three-dimensional configuration makes it difficult to direct the UV radiation from stationary sources to the exposed surfaces of the aircraft. Also, to get the required color and low gloss, the coating composition is highly pigmented and contains a flatting agent both of which can absorb radiation and/or prevent the radiation from entering the interior regions of the coating. Also, many UV-curable coating compositions have their cure inhibited by oxygen, which necessitates curing in an inert atmosphere that is not practical when coating large three-dimensional objects such as aircraft.

SUMMARY OF THE INVENTION

The present invention provides a method of providing a cured coating on a substrate such as a three-dimensional substrate such as that associated with an aircraft. The method comprises:
(a) applying to the exterior surface of the substrate a coating composition comprising:
  (i) a polyene,
  (ii) a polythiol,
  (iii) a flatting agent, and
  (iv) a coloring pigment;
(b) forming a film on the exterior surface of the substrate;
(c) exposing the film to a first dosage of UV radiation having a first wavelength; and then
(d) exposing the film to a second dosage of UV radiation having a second wavelength wherein the second dosage is greater than the first dosage and the cured coating has an 85° gloss of less than 20.

The coating composition can be applied in air to a three dimensional object such as an aircraft by manual spraying in the field and the exposure to UV radiation can also be done manually.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is also meant to include copolymer and oligomer.

Acrylic and methacrylic are designated as (meth)acrylic. Likewise, allyl and methallyl are designated as (meth)allyl.

Aliphatic and cycloaliphatic are designated as (cyclo)aliphatic.

The term "UV radiation" means radiation having the strongest wavelengths between 325 and 425 nanometers (nm).

The term "coloring pigment" also includes opacifying pigments.

Suitable polyenes for use in the present invention are numerous and can vary widely. Such polyenes can include those that are known in the art. Non-limiting examples of suitable polyenes can include those that are represented by the formula:

$$A\text{-}(X)_m$$

wherein A is an organic moiety, m is an integer of at least 2, and X is an olefinically unsaturated moiety and m is at least 2, typically 2 to 4. Examples of X are groups of the following structure:

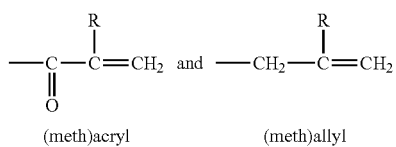

wherein each R is a radical selected from H and methyl.

The polyenes may be compounds or polymers having in the molecule olefinic double bonds that are polymerizable by exposure to radiation. Examples of such materials are (meth) acrylic-functional (meth)acrylic copolymers, epoxy resin (meth)acrylates, polyester (meth)acrylates, polyether (meth) acrylates, polyurethane (meth)acrylates, amino (meth)acrylates, silicone (meth)acrylates, and melamine (meth)acrylates. The number average molar mass (Mn) of these compounds is preferably around 200 to 10,000. The molecule preferably contains on average 2 to 20 olefinic double bonds that are polymerizable by exposure to radiation. Aliphatic and/or cycloaliphatic (meth)acrylates in each case are preferably used. (Cyclo)aliphatic polyurethane (meth)acrylates and (cyclo)aliphatic polyester (meth)acrylates are particularly preferred. The binders may be used singly or in mixture.

Specific examples of polyurethane (meth)acrylates are reaction products of the polyisocyanates such as 1,6-hexamethylene diisocyanate and/or isophorone diisocyanate including isocyanurate and biuret derivatives thereof with hydroxyalkyl (meth)acrylates such as hydroxyethyl (meth)acrylate and/or hydroxypropyl (meth)acrylate. The polyisocyanate can be reacted with the hydroxyalkyl (meth)acrylate in a 1:1 equivalent ratio or can be reacted with an NCO/OH equivalent ratio greater than 1 to form an NCO-containing reaction product that can then be chain extended with a polyol such as a diol or triol, for example 1,4-butane diol, 1,6-hexane diol and/or trimethylol propane. Examples of polyester (meth) acrylates are the reaction products of (meth)acrylic acid or anhydride with polyols, such as diols, triols and tetraols, including alkylated polyols, such as propoxylated diols and triols. Examples of polyols include 1,4-butane diol, 1,6-hexane diol, neopentyl glycol, trimethylol propane, pentaerythritol and propoxylated 1,6-hexane diol. Specific examples of polyester (meth)acrylate are glycerol tri(meth)acrylate, trimethylolpropane tri(meth)acrylate, pentaerythritol tri(meth) acrylate and pentaerythritol tetra(meth)acrylate.

Besides (meth)acrylates, (meth)allyl compounds or polymers can be used either alone or in combination with (meth) acrylates. Examples of (meth)allyl materials are polyallyl ethers such as the diallyl ether of 1,4-butane diol and the triallyl ether of trimethylol propane. Examples of other (meth)allyl materials are polyurethanes containing (meth) allyl groups. For example, reaction products of the polyisocyanates such as 1,6-hexamethylene diisocyanate and/or isophorone diisocyanate including isocyanurate and biuret derivatives thereof with hydroxyl-functional allyl ethers, such as the monoallyl ether of 1,4-butane diol and the diallylether of trimethylol propane. The polyisocyanate can be reacted with the hydroxyl-functional allyl ether in a 1:1 equivalent ratio or can be reacted with an NCO/OH equivalent ratio greater than 1 to form an NCO-containing reaction product that can then be chain extended with a polyol such as a diol or triol, for example 1,4-butane diol, 1,6-hexane diol and/or trimethylol propane.

As used herein the term "polythiol functional material" refers to polyfunctional materials containing two or more thiol functional groups (SH). Suitable polythiol functional materials for use in forming the radiation curable topcoat composition are numerous and can vary widely. Such polythiol functional materials can include those that are known in the art. Non-limiting examples of suitable polythiol functional materials can include, but are not limited to, polythiols having at least two thiol groups including compounds and polymers. The polythiol can have ether linkages (—O—), sulfide linkages (—S—), including polysulfide linkages (—S$_x$—), wherein x is at least 2, such as from 2 to 4, and combinations of such linkages.

The polythiols for use in the present invention include, but are not limited to, materials of the formula:

$$R_1—(SH)_n$$

wherein $R_1$ is a polyvalent organic moiety and n is an integer of at least 2, typically 2 to 6.

Non-limiting examples of suitable polythiols include, but are not limited to, esters of thiol-containing acids of the formula HS—$R_2$—COOH wherein $R_2$ is an organic moiety with polyhydroxy compounds of the structure $R_3$—(OH)$_n$ wherein $R_3$ is an organic moiety and n is at least 2, typically 2 to 6. These components can be reacted under suitable conditions to give polythiols having the general structure:

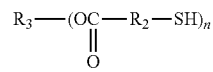

wherein $R_2$, $R_3$ and n are as defined above.

Examples of thiol-containing acids are thioglycolic acid (HS—$CH_2$COOH), α-mercaptopropionic acid (HS—CH($CH_3$)—COOH) and β-mercaptopropionic acid (HS—$CH_2CH_2$COOH) with polyhydroxy compounds such as glycols, triols, tetraols, pentaols, hexaols, and mixtures thereof. Other non-limiting examples of suitable polythiols include, but are not limited to, ethylene glycol bis (thioglycolate), ethylene glycol bis(β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), and mixtures thereof.

Typically, the polyene is present in the coating composition in amounts of 80 to 98, more typically 90 to 95 percent by weight, and the polythiol material is typically present in amounts of 2 to 20, more usually 5 to 10 percent by weight. The percentages by weight are based on total weight of polyene and polythiol.

The coating compositions also contain a flatting agent. Examples of flatting agents are particulated flatting agents including inorganic materials such as diatomaceous silica, synthetic silicas, aluminum silicate, sodium aluminum silicate, magnesium silicate, barytes, calcium carbonate, barium sulfate and talc. Also, inorganic flatting agents can be used such as urea formaldehyde condensation products, micronized waxes, micronized polyethylene and polyamide powders. Flatting agents typically have a particle size of from 3 to 75 microns and usually from 5 to 50 microns for optimum gloss reduction. The amount of flatting agent is typically from 2 to 90, usually 15 to 60 percent by weight, based on total weight of the coating composition.

The coating composition also contains a coloring pigment such as titanium oxide, zinc oxide, zirconium oxide, zinc sulfate, lithopone, iron oxide, cadmium sulfide and carbon black. The total amount of coloring pigment is from 0 to 90 percent, such as 5 to 50 percent by weight based on total weight of the coating composition. A mixture of titanium dioxide and carbon black is often used in amounts of 0.1 to 10 percent by weight carbon black and 20 to 50 percent by weight titanium dioxide. Particle size of the coloring pigment is typically in the same range as that of the flatting agent.

The topcoat composition may contain a photoinitiator when exposed to ultraviolet radiation. Suitable photoinitiators, for example, are those which absorb within the wavelength range of 325 to 425 nanometers (nm). Examples of photoinitiators are benzoin and benzoin derivatives, acetophenone, and acetophenone derivatives such as, for example, 2,2-diacetoxyacetophenone, benzophenone and benzophenone derivatives, thioxanthone and thioxanthone derivatives, anthraquinone, 1-benzoylcyclohexanol, 2-hydroxy-2-methyl-1-phenyl-1-propane, organophosphorus compounds such as, for example, acyl phosphine oxides such as bis acyl phosphine oxide. The photoinitiators when present are used in quantities of, for example, from 0.1 to 10 percent by weight, usually from 2 to 7 percent by weight based on weight of polyene and polythiol and photoinitiators. The photoinitiators are usually used in combination to accommodate the various wavelengths used in the methods of the invention.

The coating compositions optionally contain customary additives that are present in UV-curable coating compositions. These include organic solvents, rheology control agents, anti-foaming agents, wetting agents, hindered amine light stabilizers and UV absorbers. These optional ingredients are present in amounts of up to 90 percent, and usually no more than 60 percent by weight based on total weight of the coating compositions.

The coating compositions are usually prepared by simply mixing together the various ingredients. Mixing is typically accomplished at room temperature.

The coating compositions are applied to a substrate that is typically a metal substrate associated with a three dimensional object such as an aircraft. Such substrates are typically steel, aluminum and magnesium. The coating compositions may be applied directly to the substrate or to a primer coating previously applied to the substrate. When a primer is used, it is typically a UV radiation curable composition similar to the topcoat composition described above and formulated to provide enhanced corrosion resistance and adhesion.

The coating compositions, both primers and topcoats, are typically applied to the substrate by spraying. For application to aircraft, typically for application in the field, the coating compositions are applied by manual spraying using commercially available spray guns such as a turbo bell spray gun.

The thickness of the topcoat is typically from 5 to 150 microns, usually from 12 to 100 microns, in order to achieve the low gloss effect. Primer coats usually have a thickness within the above ranges.

After the top coat composition has been applied to the substrate, it is cured by exposure to UV radiation. For three dimensional objects such as aircraft exposure is usually done manually and is typically a field application. The method of curing the topcoat involves a two-step radiation exposure wherein the coating is given a first dose of UV radiation. The first dose of UV radiation is sufficient to partially cure the surface regions of the coating and to cause a surface wrinkling. The radiation is typically at a wavelength having its strongest wavelength at 395 nanometers. The second dosage of UV radiation is at a greater energy than the first and is sufficient to completely cure the coating throughout. The second dosage of UV radiation is typically done at a wavelength having its strongest wavelength at 365 nanometers. The energy density of the first dosage is typically within the range of 200 to 5000 milliJoules per square centimeter (mJ/cm$^2$). The energy density of the second dosage is typically within the range of 10,000 to 1,000,000 mJ/cm$^2$. The energy density can be controlled by adjusting the time of exposure, the distance of the UV source from the coating and/or controlling the power output from the UV source. Typically the UV source is from 3 to 25 inches from the substrate, the time of exposure is typically from 5 to 15 minutes.

Any suitable source that emits UV radiation in the wavelengths desired can be used. Suitable sources are light emitting diodes, light emitting lasers and light emitting lamps of a high pressure or medium pressure mercury vapor type. For application to aircraft, the UV source is a portable gun operated manually. Examples of such guns are UV LED lamps from Clearstone Technologies, Inc.

Topcoats produced in accordance with the invention exhibit a low gloss or matte finish with a surface that has very fine wrinkles that are generally smaller than can be seen with the unaided eye. This finely wrinkled surface along with the flatting agent results in exceedingly low gloss in the coatings obtained by the method of the invention. The gloss may be determined by the standard method of tests for specular gloss, ASTM designation D523, using a Gardner 85° gloss meter. The 85° gloss of the cured topcoat coatings of the present invention is usually 9 or below such as 5 or below.

EXAMPLES

The following examples show the preparation of a UV-curable primer formulation and a UV-curable topcoat formulation. The primer was applied to an aluminum substrate and cured. The topcoat was applied to the cured primer and given a two-step radiation cure.

Example A

A urethane polyacrylate suitable for use in the present invention was prepared by equipping a 12-liter reactor vessel with a stirring blade, nitrogen inlet, and one feed inlet. Charge 1 (see below) was added to the vessel.

Charge 1

| Component | Weight (g) |
|---|---|
| T-1890[1] | 4125.0 |
| IONOL[2] | 0.8 |
| Dibutyl tin dilaurate | 4.1 |
| Triphenyl phosphate | 20.3 |

[1]T-1890 is the isocyanurate of isophorone diisocyanate commercially available from Degussa.
[2]IONOL is 2,6-Di-t-Butyl Cresol commercially available from Cognis.

Charge 1 was heated in the reactor to a temperature of 70° C. under a nitrogen blanket. Upon reaching 70° C., Charge B was added over a period of 45 minutes or at a rate to maintain the reaction temperature at no greater than 80° C.

Charge B

| Component | Weight (g) |
|---|---|
| Sartomer SR-9003[3] | 929.6 |
| Hydroxy ethyl acrylate | 929.6 |

[3]Sartomer SR-9003 is a propoxylated neopentyl glycol diacrylate monomer and is commercially available from Sartomer Company, Inc., Exton, PA.

Upon completion of the addition of Charge B, the reaction temperature was maintained at 80° C. for one hour. After the one-hour hold, Charge C was added.

Charge C

| Component | Weight (g) |
|---|---|
| 1,6-Hexanediol | 236.92 |

With the addition of Charge C, the reaction was held until the NCO peak was no longer visible in an IR spectra of the reaction material. After completion of the reaction, Charge D was added.

Charge D

| Component | Weight (g) |
|---|---|
| Sartomer SR-9003 | 808.4 |
| Butyl acetate | 811.8 |

The urethane acrylate had a resin solids content of 61.5% (measured at 1 hour/110° C.) and a Gardner viscosity of W-Z2. The free hydroxylethyl acrylate was <0.1%. The polyacrylate described above was used in the preparation of the following coating compositions and is referred to as Acrylate 1.

Example B

A UV-curable primer coating composition was prepared from mixing together the following ingredients:

| Ingredient | Parts by Weight |
|---|---|
| Acrylate 1 | 80.2 |
| Propoxylated Neopentyl Glycol Diacrylate[1] | 6.7 |
| Black Iron Oxide[2] | 0.2 |
| China Clay | 9.6 |
| Microtalc | 9.6 |
| Barium sulfate | 6.0 |
| Calcium Carbonate | 17.8 |
| Wetting Agent[3] | 0.4 |
| Defoamer[4] | 0.2 |
| Phosphoric Acid Methacrylate Ester[5] | 4.1 |
| Anhydrous Ethanol | 12.9 |
| Tannic Acid | 0.6 |
| Bis Acyl Phosphine Oxide[6] | 2.4 |
| Methyl Isobutyl Ketone | 4.2 |
| Amyl Propionate | 54.7 |
| 4-T Thiol[7] | 1.4 |

[1]Sartomer SR 9003 from Arkema, Inc..
[2]BAYERROX 318M from Bayer Material Science.
[3]DISPERBYK 110 from BYK Additives.
[4]BYK 066N from BYK Additives.
[5]Sartomer CD 9053 from Arkema, Inc..
[6]IRGACURE 819 from Ciba Specialty Chemicals.
[7]Pentaerythritol tetrakis (3-mercaptopropionate).

Example C

A UV-curable topcoat was prepared by mixing together the following ingredients:

| Ingredient | Parts by Weight |
|---|---|
| Aliphatic Urethane Acrylate[1] | 23.6 |
| Dipropylene Glycol Diacrylate | 18.4 |
| Secondary Thiol[2] | 13.8 |
| Polyether Modified Polysiloxane[3] | 0.34 |
| 2-hydroxy-2-methyl-1-phenyl-1-propane[4] | 3.1 |
| IRGACURE 819 | 0.6 |
| Trimethylolpropane Trimethacrylate[5] | 6.9 |
| TINUVIN 400[6] | 1.6 |
| TINUVIN 123[7] | 0.7 |
| TiO$_2$ grind paste[8] | 11.0 |
| Black grind paste[9] | 0.8 |
| EFKA-4050[10] | 0.34 |
| SYLOID RAD[11] | 16.7 |
| Phosphoric Acid Methacrylate Ester[12] | 7.6 |
| ORGASOL 2002 ES4 Nat[13] | 16.7 |
| Ethyl Acetate | 14.7 |
| 2-Ethyl Hexyl Acrylate | 13.1 |

[1]GENOME 4425 from Rand USA Corp.
[2]Showa Denko Kerenz MT PE 1.
[3]TEGO GLIDE 450 from Evonik Tego Chemie GmbH.
[4]DAROCUR 1173 from Ciba Specialty Chemicals.
[5]Sartomer SR 350 from Arkema, Inc.
[6]Triazine type UV light absorber from Ciba Specialty Chemicals.
[7]Hindered amine light stabilizer from Ciba Specialty Chemicals.
[8]TiO$_2$ ground in a Genome/Dipropylene Glycol Diacrylate grinding vehicle to a Hegman 5-6 gauge; pigment to vehicle weight ratio 1.2:1.
[9]Carbon black ground in an ethoxylated trimethylolpropane triacrylate to a Hegman >6 gauge; pigment to vehicle weight ratio 0.22:1.
[10]Dispersing agent from BASF Dispersants and Pigments.
[11]Surface modified silica flatting agent from WR Grace Co.
[12]EBECRYL 168 from Cytec Industries.
[13]Polyamide powder flatting agent from Arkema Inc.

Example 1

The primer coating composition of Example B was spray applied to an aluminum substrate and cured using a UV LED 365 nm lamp at 4 inches (10 cm) target distance at 100% power setting for 10 minutes. The cured primer coat had a dry film thickness of 0.64 mils (16 microns).

The topcoat composition of Example C was spray applied to the cured primer coat and the topcoat cured using a UV LED 395 nm lamp at 20 inches (50.8 cm) target distance at 100% power setting for 10 minutes (600 mJ/cm$^2$) followed by exposure with a UV LED 365 nm lamp and target distance of 4 inches (10.16 cm) at 100% power for 10 minutes. The cured topcoat had a dry film thickness of 1.67 mils (42 microns) and an 85° gloss of 2.

The invention claimed is:

1. A method of providing a cured topcoating on the exterior surface of an aircraft comprising:
    (a) spraying manually to a primer coating on the exterior surface of the aircraft a topcoat composition comprising:
        (i) a polyene,
        (ii) a polythiol,
        (iii) 15 to 60 percent by weight of a flatting agent, and
        (iv) a coloring pigment that is a mixture of 20 to 50 percent by weight of titanium dioxide and 0.1 to 10 percent by weight of carbon black, the percentages being based on total weight of the coating composition;
    (b) forming a film on the exterior surface of the aircraft;
    (c) exposing manually the film to a first dosage of UV radiation having a first wavelength range; and then
    (d) exposing manually the film to a second dosage of UV radiation having a second wavelength range wherein the second dosage is greater than the first dosage and the cured film has an 85° gloss of less than 10.

2. The method of claim 1 wherein the first wavelength range has the strongest wavelength at 395 nm and the second wavelength range has the strongest wavelength at 365 nm.

3. The method of claim 1 wherein the first dosage is from 50 to 10,000 mJ/cm$^2$ and the second dosage is from 1000 to 1,000,000 mJ/cm$^2$.

4. The method of claim 1 in which the cured coating has a dry film thickness of 5 to 150 microns.

5. The method of claim 1 in which the flatting agent has a particle size of 3 to 75 microns.

6. The method of claim 1 in which the polyene has the structural formula

where A is an organic moiety; X is an olefinically unsaturated moiety and m is at least 2.

7. The method of claim 6 in which X is selected from —C(O)CR=CH$_2$ and —CH$_2$—CR=CH$_2$, where R is hydrogen or methyl.

8. The method of claim 6 in which A contains groups selected from ester and urethane.

9. The method of claim 6 in which A is derived from a polyisocyanate.

10. The method of claim 6 in which A-(X)$_m$ is a polyurethane (meth)acrylate.

11. The method of claim 6 in which A-(X)$_m$ is a polyester (meth)acrylate.

12. The method of claim 9 in which the polyisocyanate is an aliphatic including a cycloaliphatic polyisocyanate.

13. The method of claim 6 in which m is from 2 to 4.

14. The method of claim 1 in which the polythiol has the structural formula R$_1$(SH)$_n$ where R$_1$ is an organic moiety and n is at least 2.

15. The method of claim 14 in which R$_1$ contains ester groups.

16. The method of claim 14 in which R$_1$ is derived from a polyol.

17. The method of claim 14 in which the polythiol is the reaction product of a thiol-functional organic acid and a polyol.

18. The method of claim 14 in which n is from 2 to 4.

19. The method of claim 1 in which the polyene is present in the topcoat composition in amounts of 80 to 98 percent by weight and the polythiol is present in amounts of 2 to 20 percent by weight; the percentages by weight being based on weight of polyene and polythiol.

20. The method of claim 1 in which the cured film has an 85° gloss of 5 or below.

* * * * *